(12) United States Patent
Smith

(10) Patent No.: US 6,987,255 B2
(45) Date of Patent: Jan. 17, 2006

(54) STATE SPACE WAVEFRONT RECONSTRUCTOR FOR AN ADAPTIVE OPTICS CONTROL

(75) Inventor: Carey A. Smith, Camarillo, CA (US)

(73) Assignee: The Boeing Company, Chicago, IL (US)

(*) Notice: Subject to any disclaimer, the term of this patent is extended or adjusted under 35 U.S.C. 154(b) by 261 days.

(21) Appl. No.: 10/649,920

(22) Filed: Aug. 25, 2003

(65) Prior Publication Data

US 2005/0045801 A1 Mar. 3, 2005

(51) Int. Cl.
*G01J 1/20* (2006.01)

(52) U.S. Cl. ................................. 250/201.9; 250/216

(58) Field of Classification Search ................ None
See application file for complete search history.

(56) References Cited

U.S. PATENT DOCUMENTS

| 4,518,854 | A | 5/1985 | Hutchin |
| 6,163,381 | A | 12/2000 | Davies et al. |
| 6,653,613 | B1 * | 11/2003 | Bucourt et al. ......... 250/201.9 |

OTHER PUBLICATIONS

John W. Hardy, Adaptive Optics for Astronomical Telescopes, *Oxford University Press*, 1998 (pp. 31-33, and 55-69).
William H. Press, et al., Numerical Recipes in C: The Art of Scientific Computing, *Cambridge University Press*, 1992 (pp. 32-36, and 59-71).
Arthur Gels, Applied Optimal Estimation, *The MIT Press*, 1974 (pp. 102-112).

David L. Fried, Branch Point Problem in Adaptive Optics, *Optical Society of America*, 1998 (pp. 2759-2768).
Walter J. Wild, et al., Rapid and Robust Detection of Branch Points from Wave-Front Gradients, *Optical Society of America*, 1999 (pp. 190-192).
Glenn A. Tyler, Adaptive Optics Compensation in Strong Scintillation: Reconstruction and Assessment of the Slope Discrepancy Phase and Its Relation to Branch Points, Fitting Error and Noise, *The Optical Sciences Company*, 2000 (pp. 2-24).
Glenn A. Tyler, Reconstruction and Assessment of the Least-Squares and Slope Discrepancy Components of the Phase, *Optical Society of America*, 2000 (pp. 1828-1839).
James P. Stone, et al., Branch Cut Sensitive Wavefront Reconstruction for Low Elevation Viewing, *AMOS Seminar*, 2001 (pp. 1-10).

* cited by examiner

*Primary Examiner*—Que T. Le
(74) *Attorney, Agent, or Firm*—Thompson Coburn LLP

(57) ABSTRACT

A state space wavefront reconstructor for use in an adaptive optics control system is disclosed. The adaptive optics control system comprises a wavefront corrector having a surface controlled by a plurality of actuators, at least one wavefront sensor adapted to measure at least one wavefront state of the wavefront and generate wavefront sensor output signals indicative thereof, and a state space wavefront reconstructor adapted to receive the wavefront sensor output signals and generate a plurality of correction signals based thereon to be applied to the wavefront corrector. The wavefront reconstructor comprises a wavefront velocity estimator, a state space wavefront estimator, and a wavefront phase reconstructor. A method of compensating for the distortion of an optical wavefront using such a state space wavefront reconstructor is also disclosed.

46 Claims, 2 Drawing Sheets

STATE SPACE WAVEFRONT RECONSTRUCTOR FOR AN ADAPTIVE OPTICS CONTROL

CROSS REFERENCE TO RELATED APPLICATIONS

None.

STATEMENT REGARDING FEDERALLY SPONSORED RESEARCH OR DEVELOPMENT

None.

BACKGROUND OF INVENTION

The present invention relates to adaptive optics control and in particular, to a state space wavefront reconstructor for use in an adaptive optics control system and a method of compensating for the distortion of an optical wavefront using such a state space wavefront reconstruction.

Optical wavefronts are subject to distortion when passed through certain mediums, such as the turbulent atmosphere. These distortions can degrade the quality of images of an object being observed through an image-forming device such as a camera or telescope. In poor conditions, such distortions and degradations can be especially severe and problematic. Some of the diffractive effects of such turbulence include image blurring caused by the turbulence aberrations, scintillation caused by propagation through strong turbulence, and speckle caused by coherent scattering from diffuse objects.

Various adaptive optic control systems, mechanisms and methods have been developed to try to correct for the blurring that results from such distorted wavefronts. Examples of various such systems are disclosed in *Adaptive Optics for Astronomical Telescopes*, by John W. Hardy, Oxford University Press, 1998 (pages 31–33, and 55–69), which is incorporated herein by reference. An adaptive optic control system typically includes a wavefront phase slope sensor for measuring the phase differences or phase slopes between points of a wavefront, a wavefront reconstructor for estimating the wavefront phase from the phase differences, a control system for reducing the effects of noise, and a wavefront corrector for correcting the wavefront based thereon.

The wavefront phase slope sensor is usually in the form of a Hartmann wavefront sensor as shown in FIG. 2, although other sensors, such as a lateral-shearing interferometer, may be used. Hartmann wavefront sensors use an array of lenslets or a mask pierced with an array of holes for dividing the distorted wavefront into an array of subapertures. Each of the beams of the subapertures is focused onto one or more detectors disposed behind the holes or lenslets. When the distorted wavefront passes through the holes or lenslets, it forms an array of spots on the detectors which are indicative of the wavefront slope or tilt, if any at each corresponding subaperture. Typically, the wavefront phase slope sensor includes an analog-to-digital converter and one or more processors to compute the wavefront phase slopes.

The wavefront corrector is usually in the form of a deformable mirror which comprises a thin reflective surface to the back of which a plurality of actuators are secured. The actuators expand or contract in length upon application of a voltage or a magnetic field in accordance with the electrical commands generated by the wavefront reconstructor, thereby pushing or pulling on the faceplate and causing the mirror to change its shape to make the appropriate corrections to a distorted waveform passing through it. The actuators are typically arranged in a square or hexagonal array defining a plurality of zones, and are capable of displacing the faceplate locally within each zone by a few micrometers up or down.

Accurate reconstruction of the wavefront for control of the deformable mirror is the key sub-system in an adaptive optics system for high-end telescopes such as those used for imaging, laser-beam projection and astronomy. The phase estimation performed by the wavefront reconstructor, however, is limited by the quality of the data available. While all sensor measurements are subject to noise, there can be additional difficulties in accurately measuring the wavefront phase. Partially-filled lenslets (such as those near the aperture or near interior obscurations) cause stretching of the spot size, which can change the responsivity of a subaperture. Strong aberrations in the beam at a distance from the telescope can cause a variation in the intensity of the telescope known as scintillation. Such aberrations can be caused by high-altitude atmospheric turbulence or in optical systems looking horizontally, such as airborne laser systems. Reflection of coherent light from a distributed object can also vary the intensity of the telescope. This is known as speckle.

Scintillation and speckle also often lead to points around which the phase appears to be discontinuous when in fact it may not be. These points are known as branch points. The effect of a branch point on a wavefront is to introduce a non-zero curl; that is, the sum of the phase slopes around the branch point is a non-zero multiple of $2\pi$. When scintillation and/or speckle are present, the quality of the data used by the wavefront reconstructor is degraded. In particular, scintillation and speckle corrupt the measurements made by the wavefront phase slope sensor by changing the spot shapes and sizes on the focal-plane pixels of the wavefront corrector, which causes a non-linear response. At lenslets where the intensity goes to zero, it is possible to have multiple spots at the focal plane array within a Hartmann detector subaperture, resulting in a badly corrupted measurement.

In benign conditions, the reconstructor may be a least-squares estimator, as described by Hardy or in William H. Press, et al, *"Numerical Recipes in C: The Art of Scientific Computing,"* by William H. Press, Cambridge University, 1992, also incorporated herein by reference. However, the least-squares approach ignores branch points, and so the reconstructor's performance is degraded by them. Existing methods that attempt to identify and correct for branch points are usually challenged by the quality of the data. This causes the identification of branch-points to be ambiguous, and often leads to branch point false alarms. In such cases, a correction is made for a non-existent branch point, which degrades the phase estimate calculated by the wavefront reconstructor.

Various reconstructors and adaptive control systems have been developed to try to correct or compensate for the problems associated with scintillation and speckle. These approaches to wavefront phase estimation/reconstruction typically include temporal or spatial filters to suppress noise. However, the ambiguities caused by corrupted data rather than by noise cannot be eliminated simply by increasing the signal-to-noise ratio or by filtering the resulting estimates. In addition, existing reconstructors only support estimations of present states. Scintillation and speckle errors, however, change over time as the wavefront moves across the aperture.

Accordingly, there is a need for an improved wavefront reconstructor that more accurately estimates the phase of a wavefront in an optical system, especially in strong turbulence conditions.

BRIEF SUMMARY OF THE INVENTION

An adaptive optics control system for compensating distorted wavefronts each having a plurality of states including at least one of a velocity, intensities, phase slopes, and branch points is disclosed. The system includes a wavefront corrector having a surface controlled by a plurality of actuators, at least one wavefront sensor adapted to measure at least one state of the wavefront at a current point in time and to generate wavefront sensor output signals indicative of the at least one measured wavefront state, and a state space wavefront reconstructor adapted to receive the wavefront sensor output signals and generate a plurality of correction signals based thereon to be applied to the wavefront corrector.

The state space wavefront reconstructor includes a state space wavefront estimator adapted to estimate a plurality of wavefront states at the current point in time, and a wavefront phase reconstructor adapted to receive the wavefront state estimates, estimate a wavefront phase at the current point in time, and generate the plurality of correction signals based on the estimated wavefront phase. The wavefront reconstructor may further include a zero curl phase reconstructor and/or a non-zero curl phase reconstructor, and the zero curl reconstructor and the non-zero curl phase reconstructor may be separate or combined in a single reconstructor.

The state space wavefront estimator is adapted to predict a plurality of wavefront states and wavefront sensor measurements at the current point in time based on the wavefront state estimates at a previous point in time, and the wavefront state estimates are based on the predicted wavefront states and the differences between the predicted wavefront sensor measurements and the measured wavefront states. The state space wavefront estimator may include a wavefront velocity estimator adapted to estimate the velocity of the wavefront at the current point in time, or the wavefront velocity estimator may be separate therefrom. The state space wavefront estimator includes at least one processor and may be implemented as a Kalman filter or a statistically based algorithm.

The at least one wavefront sensor may include a wavefront phase slope sensor adapted to measure the wavefront phase slopes of the wavefront and/or a wavefront intensity sensor adapted to measure the intensities of the wavefront. The wavefront velocity estimated by the wavefront velocity estimator is based on at least one of the measured wavefront phase slopes and the measured wavefront intensities at the current point in time and at least one of the measured wavefront phase slopes and the measured wavefront intensities at a previous point in time. In one embodiment, the wavefront phase slope sensor and the wavefront intensity sensor are separate sensors.

The adaptive optics control system may further include a control system in communication with the wavefront corrector and adapted to condition the plurality of correction signals prior to them being applied to the wavefront corrector. The control system may be digital or analog. The adaptive optics control system may also include memory adapted to store the measured wavefront states, the estimated wavefront states, the predicted wavefront states and the predicted wavefront sensor measurements.

A state space wavefront reconstructor for use in an adaptive optics control system for compensating distorted wavefronts as described above is also disclosed.

A method of compensating for distortion of an optical wavefront using a state space wavefront reconstructor is also disclosed. The method includes measuring at least one state of the wavefront with at least one wavefront sensor at a current point in time and generating wavefront sensor output signals indicative of the at least one measured wavefront state, estimating a plurality of wavefront states at a current point in time, estimating a wavefront phase at the current point in time based on the estimated wavefront states, and generating correction signals based on the estimated wavefront phase.

The step of estimating the wavefront states includes predicting a plurality of wavefront states and a plurality of wavefront state measurements at the current point in time based on the wavefront state estimates and the wavefront sensor measurements at a previous point in time. The estimated wavefront phase is based on the predicted wavefront states and the differences between the predicted wavefront sensor measurements and the measured wavefront states. The step of estimating the wavefront states is performed through the use of either Kalman filter or a statistically based algorithm.

The method may further include applying the plurality of correction signals to a wavefront corrector.

The at least one measured wavefront state may include wavefront phase slopes and/or wavefront intensities, the step of estimating a plurality of wavefront states may include estimating a wavefront velocity, and the step of estimating the wavefront velocity may include comparing the measured wavefront phase slopes and/or the measured wavefront intensities at the current point in time with the corresponding wavefront phase slopes and/or wavefront intensities at a previous point in time.

The method may further include determining any covariances between the estimated wavefront states and the measured wavefront states, and adjusting the wavefront state estimates based on the covariances. The method may also further include conditioning the plurality of correction signals prior to their application to the wavefront corrector.

DETAILED DESCRIPTION OF THE INVENTION

Figure 1:
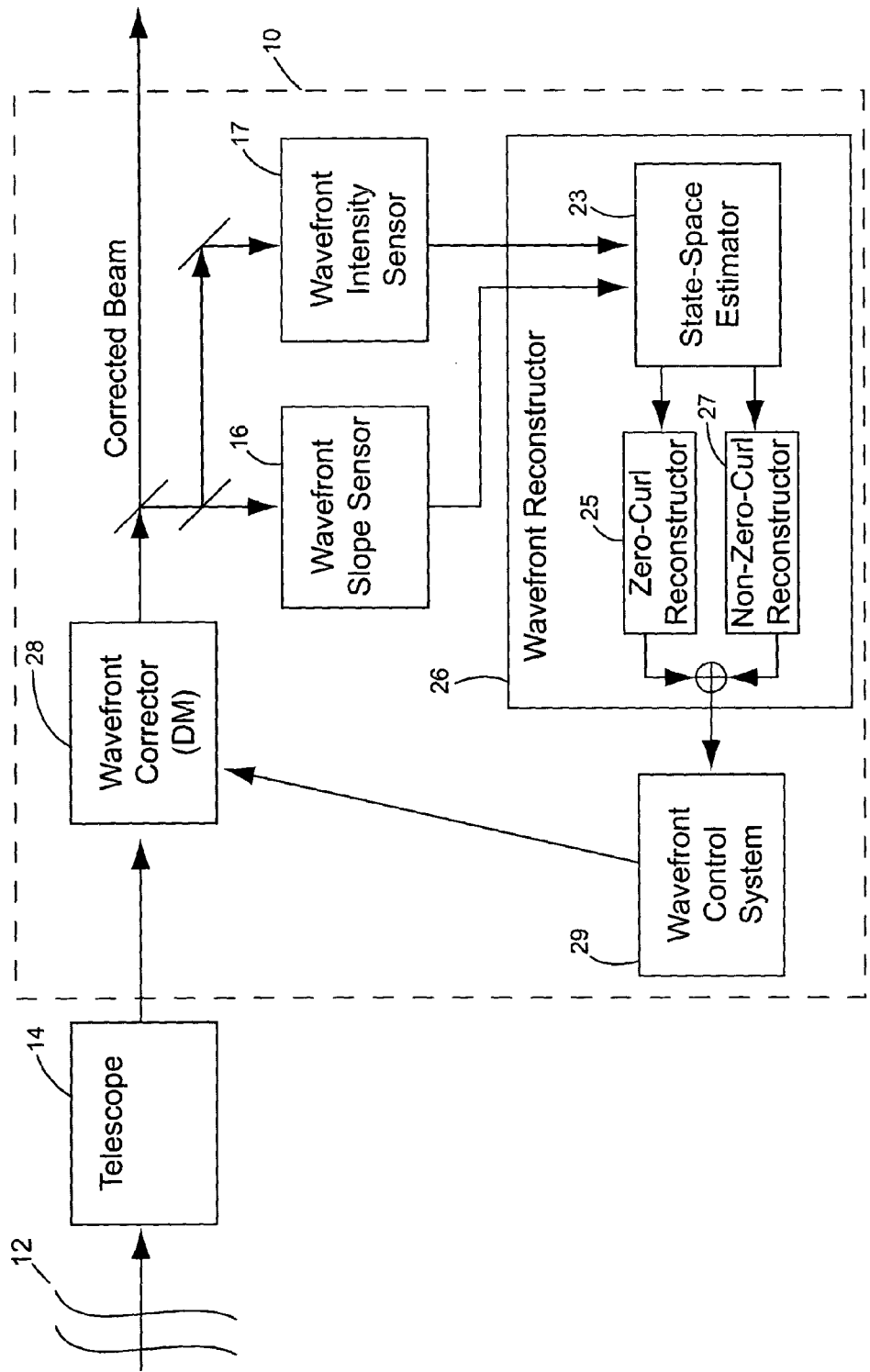
FIG. 1 is a block diagram representing an adaptive optical control system in accordance with one embodiment of the present invention.

An adaptive optics control system 10 for compensating a distorted wavefront 12 in accordance with one embodiment of the present invention is shown in FIG. 1. While the system will be discussed in connection with a telescope 14 for space applications, it can be appreciated that it can be used with any device and in connection with any medium involving optical wavefronts that are subject to distortion. The system 10 is a closed loop system consisting of a wavefront phase slope sensor 16, a wavefront intensity sensor 17, a state space wavefront reconstructor 26, a wavefront control system 29, and a wavefront corrector 28. The wavefront reconstructor 26 includes a state-space estimator 23 and may include a zero-curl phase reconstructor 25, a non-zero-curl reconstructor 27, or both.

Figure 2:
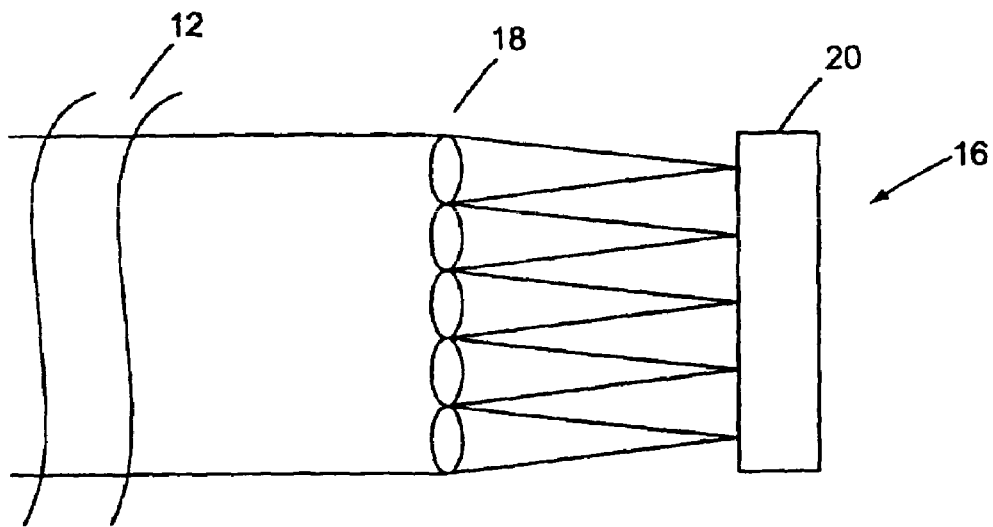
FIG. 2 is a cross-sectional view of one embodiment of the wavefront phase slope sensor of FIG. 1.

While the wavefront corrector will be discussed in connection with a deformable mirror, it can be appreciated that any other corrector, such as a spatial light modulator, may be used and the term deformable mirror as used herein applies to both. In addition, the term correct and variants thereof as used herein shall be synonymous with the term compensate in that it can be appreciated that a complete correction of the distorted wavefront is not required. As shown in FIG. 2, the deformable mirror 28 comprises a thin reflective surface 30 controlled by a plurality of actuators 32 secured to the back thereof. In a preferred embodiment, the actuators 32 are piezo-electric actuators, but it can be appreciated that any type of actuator may be used. The size of a deformable mirror may vary depending on the application, ranging in size from about five centimeters in diameter for a small mirror with 21 actuators, to up to about forty centimeters in diameter for a large mirror with 2,000 actuators. In addition, while not shown, a steering mirror may be positioned in front of the wavefront corrector in order to optimize the correction range of the deformable mirror.

Referring back to FIG. 1, the wavefront phase slope sensor 16 receives the distorted wavefront 12 and measures the departure of the wavefront from a plane wave. One well known embodiment of a wavefront phase slope sensor known as a Hartmann wavefront phase slope sensor is shown in FIG. 2 and disclosed in U.S. Pat. No. 4,518,854, which is incorporated herein by reference. It can be appreciated, however, that any type of wavefront phase slope sensor may be used, including without limitation a lateral shearing interferometer wavefront phase slope sensor as disclosed in U.S. Pat. No. 6,163,381, which is incorporated herein by reference. The wavefront phase slope sensor 16 uses an array of lenslets 18 for dividing the distorted wavefront 12 into a plurality of subapertures. It can be appreciated, however, that any means for subaperture separation may be used, such as a mask pierced with a plurality of holes. Wavefront phase slope sensor 16 includes a corresponding detector array 20 having a plurality of pixels (not shown) disposed behind each lenslet 18 of the wavefront phase slope sensor 16 and aligned therewith. When the distorted wavefront passes through the lenslets, it forms an array of spots on the detectors, which are indicative of the wavefront error at each subaperture. Typically, the detector array is a focal plane array, such as a charge coupled device (CCD) camera. However, any type of detector array may be used.

Figure 3A:
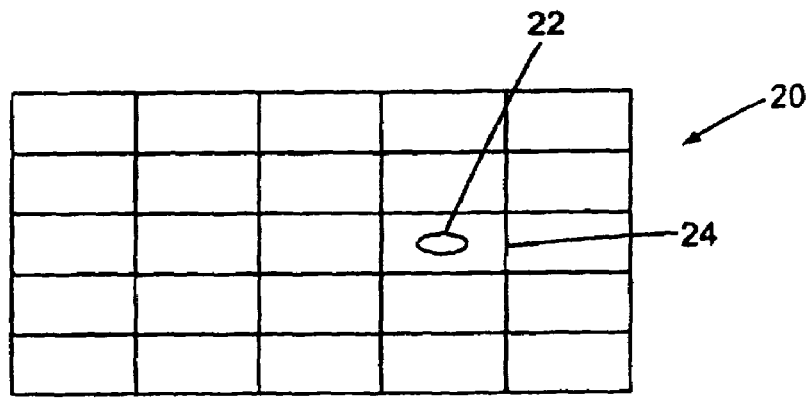
FIG. 3A is a diagram of the detector of FIG. 2.
Figure 3B:
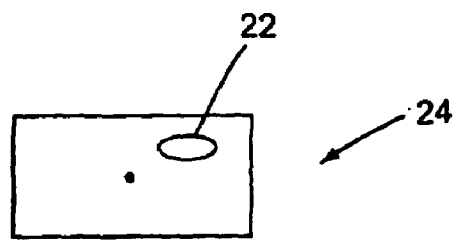
FIG. 3B is a diagram of a detector zone of the detector of FIG. 3A

In a preferred embodiment as shown in FIG. 3A, the lenslets 18 and detectors 20 are each in the form of a two-dimensional array or matrix made up of a plurality of subaperture zones (not shown) and detector zones 24, respectively. The size of the array may vary depending on the particular application. The number of lenslets 18, however, is preferably selected to correspond to the number of actuators 32 of the wavefront corrector 28. As shown in FIG. 3B, when the distorted wavefront 12 passes through the lenslets 18, it produces a corresponding array of spots 22 within each detector zone 24. The location of the centroid of each spot 22 is indicative of the local wavefront slope or tilt, if any, in the corresponding subaperture. Typically, the wavefront phase slope sensor includes an analog to digital converter and one or more processors to compute the wavefront slopes. The output of the wavefront phase slope sensor 16 consists of output signals corresponding to zonal measurements from each detector zone 24 representing the local wavefront phase slopes of each subaperture in two orthogonal axes.

The system 10 may also include a wavefront intensity sensor 17 for measuring the intensities of the wavefront on a grid of points for use in estimating the wavefront velocity as further described herein. The wavefront intensity sensor may be separate from the wavefront phase slope sensor or may be incorporated therein. If the wavefront intensity sensor is incorporated into the wavefront phase slope sensor subapertures, the spatial resolution of the intensity measurements would be limited to the lenslet spacing. A separate wavefront intensity sensor may have much higher spatial resolution (i.e., one measurement per camera pixel). The wavefront intensity sensor preferably consists of a camera with an array of pixels, such as a CCD camera, an analog-to-digital converter and a processor. The camera is preferably imaged at the same location as the wavefront phase slope sensor. While this image location is often the wavefront corrector, it is not required to be. In a preferred embodiment, the camera has multiple pixels corresponding to each lenslet of the wavefront phase slope sensor so that it can measure the intensity variation across the lenslet.

Referring back to FIG. 1, the wavefront phase slope sensor output signals and wavefront intensity sensor output signals are transmitted to the wavefront reconstructor 26 which then generates corresponding correction signals based thereon to be applied to each actuator 32 of the wavefront corrector 28. The wavefront reconstructor 26 includes one or more processors and memory (all not shown). It is understood by one skilled in the art that these signals may be processed by various methods including by hardware, software or a combination thereof, and that many processors are suitable for this purpose. The memory stores the wavefront phase slope sensor and wavefront intensity sensor measurements, as well as estimated and predicted wavefront states and measurements as further described below.

In one embodiment, the wavefront reconstructor 26 includes a wavefront velocity estimator (not shown), a state space estimator 23, and a wavefront phase reconstructor which may include either a traditional (i.e., zero-curl) phase reconstructor 25, a non-zero-curl reconstructor 27, or both. The wavefront velocity estimator and state space estimator 23 may be implemented separately or they may be combined into a single estimator. Likewise, the zero-curl and non-zero curl reconstructors may be implemented separately or they may be combined into a single reconstructor. The state space estimator 23 described herein is novel for use in adaptive optics control systems and provides a processing improvement over existing reconstruction methods. The state space estimator uses an algorithm, which describes the wave front as a function of time, which gives an additional dimension of data to aid in improving the wavefront state estimates calculated thereby. The "state" vector of the system, $x_n$, describes the system parameters of interest at a point in time or iteration, n. For example, the state values may include the intensities, phase, phase slopes and velocity of the wavefront, as well as branch point estimates. The equation that describes how the state is estimated to change from one point in time to the next is set forth below:

$$\underline{x}_n = \underline{A}\underline{x}_{n-1} + \underline{B}\underline{w}_n \quad (1)$$

where, $x_n$=the state of the system at time iteration n, $w_n$=the unknown changes to the state, modeled as noise, at time iteration n, A=a matrix that models how the state of the system updates from iteration n−1 to iteration n, and B=a matrix that factors in any noise correlations in the state.

The equation that relates the measurements from the wavefront phase slope sensor and wavefront intensity sensor to the states is set forth below:

$$y_n = Cx_n + Dv_n \quad (2)$$

where, $y_n$=the measurements at time iteration n, $v_n$=noise in the measurements, C=a matrix that relates the measurements to the state of the system, and D=a matrix that factors in any noise correlations in the measurements.

Based on the measurements from the wavefront phase slope sensor and/or the wavefront intensity sensor, the state of the system can be optimally estimated using the well-known method of Kalman filtering, which predicts a state and measurements and then corrects the predicted state in a statistically optimal way. An example of such a method can be found in *Applied Optimal Estimation* by A. Gelb, MIT Press, Cambridge, Mass., 1974, which is incorporated herein by reference. With a state-space approach, the control system takes into account the time-domain movement of the wavefront across the aperture of the telescope, and as a result, the wavefront estimate is smoother and less prone to branch-point false-alarms than estimates obtained solely from using current measurements.

The various state values are derived from the measurements of the various components of system 10. In particular, the wavefront intensities are measured by the wavefront intensity sensor 17, the wavefront phase slopes are measured by the wavefront phase slope sensor 16, the wavefront velocities are estimated by the wavefront velocity estimator 19 (based on the phase slope and intensity measurements), and the wavefront phase and branch points are estimated by the wavefront reconstructor 26. By estimating the wavefront velocity and using it to improve the wavefront phase estimate through the state-space estimation model, the adaptive optics system's performance is improved, especially in cases where the wavefront is strongly aberrated.

The wavefront velocity may be estimated in a number of ways, two of which are described below. It is understood by one skilled in the art that the velocity may also be computed by means of other known tracking algorithms. If multiple estimates of the wavefront velocity are computed, they may be combined, either through a Kalman filter based on their statistics or through a weighted average.

For a scintillated beam, the wavefront velocity can be estimated through the correlation of the wavefront intensity sensor's high-resolution measurement of the current intensity pattern with the previous iteration's intensity pattern shifted positively and/or negatively in both the x and y directions. The mean value of the intensity can be subtracted to give significance to both the low and the high regions as set forth below:

$$vi_k = c_i \frac{\left[ \sum_j I(k,j) I(k-1, j+\Delta j) - \sum_j I(k,j) I_j(k-1, j-\Delta j) \right]}{\left[ \sqrt{\sum_j I(k,j)^2} \sqrt{\sum_j I(k-1,j)^2} \right]} \quad (3)$$

where,

I(k,j)=the intensity at time k of pixel j, k=a discrete time index,

Δj=a spatial shift, and $c_i$=a scaling constant.

The wavefront velocity can also be estimated through the correlation of the measured phase slopes of the wavefront phase slope sensor with the previous iteration's phase slopes shifted positively and/or negatively in both the x and y directions as set forth below:

$$vs_k = d_i \frac{\left[ \sum_l S(k,l) S(k-1, l+\Delta l) - \sum_j S(k,l) S_j(k-1, l-\Delta l) \right]}{\left[ \sqrt{\sum_l S(k,l)^2} \sqrt{\sum_l S(k-1,l)^2} \right]} \quad (4)$$

where,

S(k,l)=the phase slope at time k of pixel l, k=a discrete time index,

Δl=a spatial shift, and $d_i$=a scaling constant.

Once the velocity estimate is computed, it is used in matrix "A" of equation (1). In particular, at each iteration, equation (1) is used to predict the current state based on the last iteration, while equation (2) is used to predict the current measurement. The difference between the actual measurements and the predicted measurements are then used—along with the predicted states and the covariances of the states and measurements—to correct the state estimate, preferably using the well-established methods of Kalman filtering as discussed above, which account for the variances of the state estimate and the noise. Alternatively, one may use other statistical or non-statistical equations.

In the preferred embodiment, equations 1 through 4 combine additional sensor information and use multiple frames of data to yield higher quality phase slope and branch-point estimates to minimize the ambiguities of a single frame of wavefront phase slope sensor measurements. The branch-point components of the state vector include the branch-point positions, velocities, and curl values. While the actual branch points have integer curl values, the state estimates will be fractional. As the amount of data increases and the accuracy of the estimates increases, the curl values will cluster around integer values and reduce the ambiguity in identifying branch points.

While the invention has been illustrated and described in connection with several preferred embodiments, it will be appreciated that further changes can be made therein without departing from the spirit and scope of the invention. For example, while the invention has been discussed with reference to a telescope for use in space applications, it applies to any optical system, including without limitation directed-energy laser systems, imaging systems, and laser communication systems. Likewise, where the term "based" is used, it is meant to include anything based in part or in whole. Accordingly, it is intended that the scope of the invention not be limited by the disclosure of the preferred embodiments, but instead be determined entirely by reference to the claims that follow.

I claim:

1. An adaptive optics control system for compensating distorted wavefronts, each having a plurality of states including at least one of a velocity, intensities, phase slopes, and branch points, the system comprising:
   a wavefront corrector having a surface controlled by a plurality of actuators;
   at least one wavefront sensor adapted to measure at least one state of the wavefront at a current point in time and to generate wavefront sensor output signals indicative of the at least one measured wavefront state; and
   a state space wavefront reconstructor adapted to receive the wavefront sensor output signals and generate a plurality of correction signals based thereon to be applied to the wavefront corrector.

2. The adaptive optics control system of claim 1, wherein the state space wavefront reconstructor comprises:
   a state space wavefront estimator adapted to estimate a plurality of wavefront states at the current point in time; and
   a wavefront phase reconstructor adapted to receive the wavefront state estimates, estimate a wavefront phase at the current point in time, and generate the plurality of correction signals based on the estimated wavefront phase.

3. The adaptive optics control system of claim 2, wherein the state space wavefront estimator is adapted to predict a plurality of wavefront states and wavefront sensor measurements at the current point in time based on the wavefront state estimates at a previous point in time, and wherein the wavefront state estimates are based on the predicted wavefront states and the differences between the predicted wavefront sensor measurements and the measured wavefront states.

4. The adaptive optics control system of claim 2, wherein the state space wavefront estimator comprises a wavefront velocity estimator adapted to estimate the velocity of the wavefront at the current point in time.

5. The adaptive optics control system of claim 4, wherein the at least one wavefront sensor comprises at least one of a wavefront phase slope sensor adapted to measure the wavefront phase slopes of the wavefront and a wavefront intensity sensor adapted to measure the intensities of the wavefront.

6. The adaptive optics control system of claim 5, wherein the wavefront velocity estimated by the wavefront velocity estimator is based on at least one of the measured wavefront phase slopes and the measured wavefront intensities at the current point in time and at least one of the measured wavefront phase slopes and the measured wavefront intensities at a previous point in time.

7. The adaptive optics control system of claim 5, wherein the wavefront phase slope sensor and the wavefront intensity sensor are separate sensors.

8. The adaptive optics control system of claim 2, further comprising a wavefront velocity estimator adapted to estimate the velocity of the wavefront at the current point in time.

9. The adaptive optics control system of claim 8, wherein the at least one wavefront sensor comprises at least one of a wavefront phase slope sensor adapted to measure the wavefront phase slopes of the wavefront and a wavefront intensity sensor adapted to measure the intensities of the wavefront.

10. The adaptive optics control system of claim 9, wherein the wavefront velocity estimated by the wavefront velocity estimator is based on at least one of the measured wavefront phase slopes and the measured wavefront intensities at the current point in time and at least one of the measured wavefront phase slopes and the measured wavefront intensities at a previous point in time.

11. The adaptive optics control system of claim 9, wherein the wavefront phase slope sensor and the wavefront intensity sensor are separate sensors.

12. The adaptive optics control system of claim 1, further comprising a control system in communication with the wavefront corrector and adapted to condition the plurality of correction signals prior to them being applied to the wavefront corrector.

13. The adaptive optics control system of claim 12, wherein the control system is digital.

14. The adaptive optics control system of claim 12, wherein the control system is analog.

15. The adaptive optics control system of claim 3, further comprising memory adapted to store the measured wavefront states, the estimated wavefront states, the predicted wavefront states and the predicted wavefront sensor measurements.

16. The adaptive optics control system of claim 1, wherein the wavefront reconstructor further comprises at least one of a zero curl phase reconstructor and a non-zero curl phase reconstructor.

17. The adaptive optics control system of claim 16, wherein the zero curl reconstructor and the non-zero curl phase reconstructor comprise a single reconstructor.

18. The adaptive optics control system of claim 2, wherein the state space wavefront estimator comprises at least one processor and is implemented as a Kalman filter.

19. The adaptive optics control system of claim 2, wherein the state space wavefront estimator comprises at least one processor and is implemented as a statistically based algorithm.

20. A state space wavefront reconstructor for use in an adaptive optics control system for compensating distorted wavefronts, each wavefront having a plurality of states including at least one of a velocity, intensities, phase slopes and branch points, the system having a wavefront corrector and at least one wavefront sensor adapted to measure at least one state of the wavefront at a current point in time, the state space wavefront reconstructor comprising:
   a state space wavefront estimator adapted to estimate a plurality of wavefront states at the current point in time; and
   a wavefront phase reconstructor adapted to receive the wavefront state estimates, estimate a wavefront phase at the current point in time, and generate a plurality of correction signals based on the estimated wavefront phase, the correction signals for application to a wavefront corrector in communication with the state space reconstructor.

21. The state space wavefront reconstructor of claim 20, wherein the state space wavefront estimator is adapted to predict a plurality of wavefront states and wavefront sensor measurements at the current point in time based on the wavefront state estimates at a previous point in time, and calculate wavefront state estimates based on the predicted wavefront states and the differences between the predicted wavefront sensor measurements and the measured wavefront states.

22. The state space wavefront reconstructor of claim 20, further comprising a wavefront velocity estimator adapted to estimate the velocity of the wavefront at the current point in time.

23. The state space wavefront reconstructor of claim 22, wherein the at least one wavefront sensor comprises at least one of a wavefront phase slope sensor adapted to measure the wavefront phase slopes of the wavefront at the current point in time and a wavefront intensity sensor adapted to measure the wavefront intensities of the wavefront at the current point in time.

24. The state space wavefront reconstructor of claim 23, wherein the estimated wavefront velocity is based on at least one of the measured wavefront phase slopes and the wavefront intensities at the current point in time and at least one of the measured wavefront phase slopes and measured wavefront intensities at a previous point in time.

25. The state space wavefront reconstructor of claim 23, wherein the wavefront phase slope sensor and the wavefront intensity sensor are separate sensors.

26. The state space wavefront reconstructor of claim 20, wherein the state space wavefront estimator comprises a wavefront velocity estimator adapted to estimate the velocity of the wavefront at the current point in time.

27. The state space wavefront reconstructor of claim 26, wherein the at least one wavefront sensor comprises at least one wavefront phase slope sensor adapted to measure the wavefront phase slopes of the wavefront at the current point in time, and a wavefront intensity sensor adapted to measure the wavefront intensities of the wavefront at the current point in time.

28. The state space wavefront reconstructor of claim 27, wherein the estimated wavefront velocity is based on at least one of the measured wavefront phase slopes and the measured wavefront intensities at the current point in time and at least one of the measured wavefront phase slopes and the measured wavefront intensities at a previous point in time.

29. The state space wavefront reconstructor of claim 27, wherein the wavefront phase slope sensor and the wavefront intensity sensor are separate sensors.

30. The state space wavefront reconstructor of claim 20, wherein the state space wavefront estimator comprises at least one processor and is implemented as a Kalman filter.

31. The state space wavefront reconstructor of claim 20, wherein the state space wavefront estimator comprises at least one processor and is implemented as a statistically based algorithm.

32. The state space wavefront reconstructor of claim 20, wherein the wavefront phase reconstructor comprises at least one of a zero curl phase reconstructor and a non-zero curl phase reconstructor.

33. The state space wavefront reconstructor of claim 32, wherein the zero curl phase reconstructor and the non-zero curl phase reconstructor comprise a single reconstructor.

34. The state space wavefront reconstructor of claim 21, further comprising a memory for storing the measured wavefront states, the estimated wavefront states, the predicted wavefront states, and the predicted wavefront state measurements.

35. A method of compensating for distortion of an optical wavefront using a state space wavefront reconstructor, the method comprising:
  measuring at least one state of the wavefront with at least one wavefront sensor at a current point in time and generating wavefront sensor output signals indicative of the at least one measured wavefront state;
  estimating a plurality of wavefront states at a current point in time;
  estimating a wavefront phase at the current point in time based on the estimated wavefront states; and
  generating correction signals based on the estimated wavefront phase.

36. The method of claim 35, wherein the step of estimating comprises:
  predicting a plurality of wavefront states and a plurality of wavefront state measurements at the current point in time based on the wavefront state estimates and the wavefront sensor measurements at a previous point in time.

37. The method of claim 36, wherein the estimated wavefront phase is based on the predicted wavefront states and the differences between the predicted wavefront sensor measurements and the measured wavefront states.

38. The method of claim 35, further comprising applying the plurality of correction signals to a wavefront corrector.

39. The method of claim 35, wherein the step of estimating the wavefront states comprises estimating at least one of a wavefront velocity, wavefront phase slopes, wavefront intensities and branch points.

40. The method of claim 35, wherein the step of estimating the wavefront states is performed through the use of a Kalman filter.

41. The method of claim 35, wherein the step of estimating the wavefront states is performed through the use of a statistically based algorithm.

42. The method of claim 35, wherein the at least one measured wavefront state comprises the wavefront intensities, wherein the step of estimating a plurality of wavefront states comprises estimating a wavefront velocity, and wherein the step of estimating the wavefront velocity comprises comparing the measured wavefront intensities at the current point in time with the measured wavefront intensities at a previous point in time.

43. The method of claim 35, wherein the at least one measured wavefront state comprises wavefront phase slopes, wherein the step of estimating a plurality of wavefront states comprises estimating a wavefront velocity, and wherein the step of estimating the wavefront velocity comprises comparing the measured wavefront phase slopes at the current point in time with the measured wavefront phase slopes at a previous point in time.

44. The method of claim 35, wherein the at least one measured wavefront state comprises at least one of wavefront phase slopes and wavefront intensities, wherein the step of estimating a plurality of wavefront states comprises estimating a wavefront velocity, and wherein the step of estimating the wavefront velocity comprises comparing at least one of the measured wavefront phase slopes and the measured wavefront intensities at the current point in time-with the at least one of the corresponding wavefront phase slopes and wavefront intensities at a previous point in time.

45. The method of claim 35, further comprising:
   determining any covariances between the estimated wavefront states and the measured wavefront states; and
   adjusting the wavefront state estimates based on the covariances.

46. The method of claim 35, further comprising conditioning the plurality of correction signals prior to their application to the wavefront corrector.

* * * * *